(12) United States Patent
Kasahara et al.

(10) Patent No.: US 6,299,208 B1
(45) Date of Patent: Oct. 9, 2001

(54) OCCUPANT PROTECTION STRUCTURE

(75) Inventors: Hisao Kasahara; Yoshinobu Inomoto; Katsumi Kikuchi, all of Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/312,606

(22) Filed: May 17, 1999

(30) Foreign Application Priority Data

May 15, 1998 (JP) .................................................. 10-152086

(51) Int. Cl.$^7$ .................................................. B60R 21/02
(52) U.S. Cl. ............................................. 280/752; 280/748
(58) Field of Search ................................. 280/752, 748, 280/730.1, 751, 753; 296/35.2

(56) References Cited

U.S. PATENT DOCUMENTS

| | | | |
|---|---|---|---|
| 4,317,582 | * 3/1982 | Cottin et al. ........................... | 280/751 |
| 4,709,943 | * 12/1987 | Yoshimura et al. .................. | 280/751 |
| 4,978,136 | * 12/1990 | Tomita et al. ......................... | 280/751 |
| 5,413,379 | * 5/1995 | Koma .................................... | 280/752 |
| 5,718,453 | * 2/1998 | Kassel et al. ......................... | 280/752 |
| 5,927,755 | * 7/1999 | Matsuo et al. ........................ | 280/752 |
| 5,951,045 | * 9/1999 | Almefelt et al. ...................... | 280/748 |
| 6,196,588 | * 3/2001 | Sugawara ............................. | 280/779 |

FOREIGN PATENT DOCUMENTS

| | | |
|---|---|---|
| 7-2035 | 1/1995 | (JP) . |
| 7-13612 | 7/1995 | (JP) . |

* cited by examiner

*Primary Examiner*—Brian L. Johnson
*Assistant Examiner*—Tony Winner
(74) *Attorney, Agent, or Firm*—Smith, Gambrell & Russell LLP

(57) ABSTRACT

A knee guard on the passenger side of a vehicle includes left and right knee guard brackets disposed along left and right side faces of a glove box and secured at a front end thereof to a steering support beam, a connecting member transversely connecting these left and right knee guard brackets and a closure member of the glove box. The closure member includes a reinforcement therein and the reinforcement has a closed cross section which extends in the widthwise direction of the vehicle. When the knees of a passenger abut against the closure member of the glove box in the event of a head-on impact, the closure member is displaced forwardly and abuts against the left and right knee guard brackets, thereby an impact load is transmitted to the knee guard brackets.

5 Claims, 2 Drawing Sheets

OCCUPANT PROTECTION STRUCTURE

BACKGROUND OF THE INVENTION

1. Field of the Invention

The present invention relates to an occupant protection structure for a motor vehicle and more particularly to a knee guard structure for protecting knees of an occupant at the event of a collision.

2. Prior Art

Generally, when a vehicle has a collision, an occupant is thrown forwardly. Particularly, when a safety belt or an air bag holds the upper part of the occupant's body, the lower part of the body is thrown under an instrument panel. In such a situation, the knee guard structure supports the knees of the occupant to prevent the occupant from getting in under the instrument panel. An example of the knee guard structure is disclosed in Japanese Patent Application Laid-open No. Toku-Kai-Hei 7-2035.

In the disclosure, the knee guard is provided at the lower part of the instrument panel so as to be located opposite to the knees of an occupant seated. On the passenger side, there is provided a glove box at the lower part of the instrument panel. A knee guard bracket is disposed on both ends of the glove box, respectively and a connecting member interconnects between both brackets. At the event of an impact, the knees of the passenger has a contact with a lid of the glove box and an impact load is inputted to the left and right knee guard brackets through the lid.

When the vehicle has a head-on collision, the knees of the passenger do not always abut against the knee guard orthogonally. Especially, at the event of an offset collision or an oblique collision, the knees abut against the knee guard partially or in the diagonal direction. According to the prior art, when the knees of the passenger abut against the left and right brackets through the lid of the glove box, since these brackets are disposed apart from each other, it is difficult to transfer the impact load received from the lid of the glove box uniformly to the brackets. That is, an impact energy is difficult to be absorbed efficiently.

SUMMARY OF THE INVENTION

It is an object of the present invention to provide a knee guard structure for a vehicle capable of efficiently absorbing shock without reducing the size of a glove box when knees of an occupant of the vehicle abuts against a knee guard in an event of an impact.

To achieve the object, the knee guard structure according to the present invention comprises left and right knee guard brackets secured to a steering support beam with a glove box between, a connecting member transversely connecting the left and right knee guard brackets, a closure member of the glove box composed of an outer panel and an inner panel and disposed adjacent to the left and right knee guard brackets and a reinforcement provided between the inner and outer panels and having a closed cross section extended in the widthwise direction of the vehicle up to left and right end portions of the closure member.

DETAILED DESCRIPTION OF THE PREFERRED EMBODIMENTS

Figure 1:
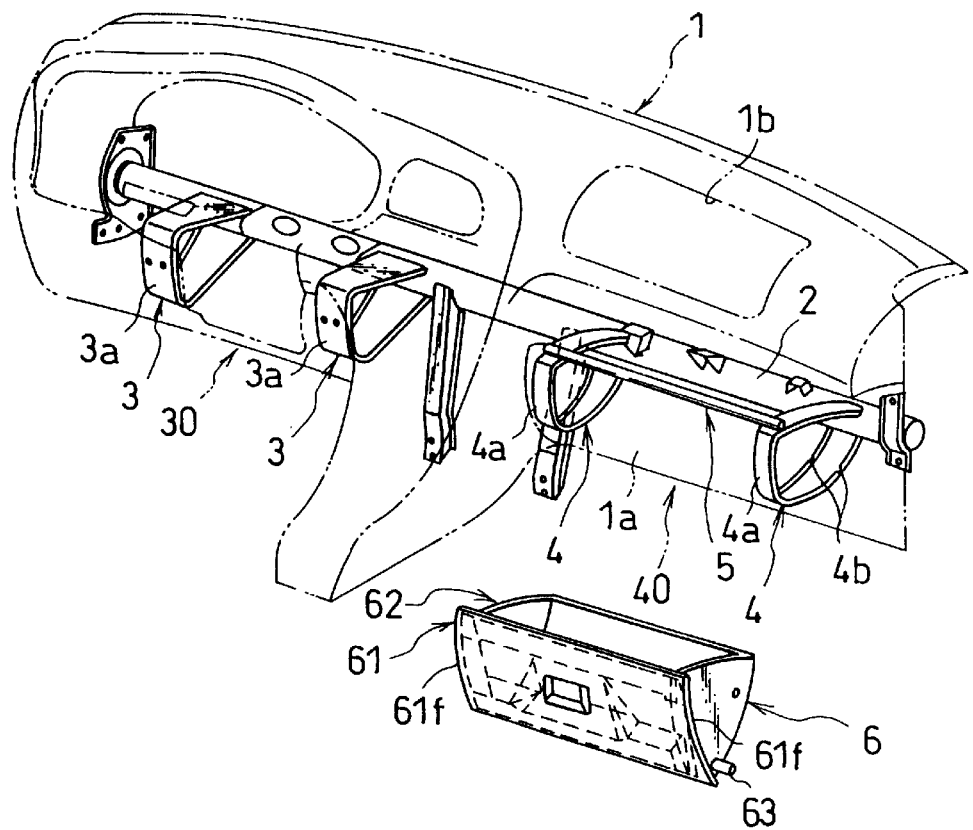
FIG. 1 is an exploded perspective view of an instrument panel for a vehicle.
Figure 2:
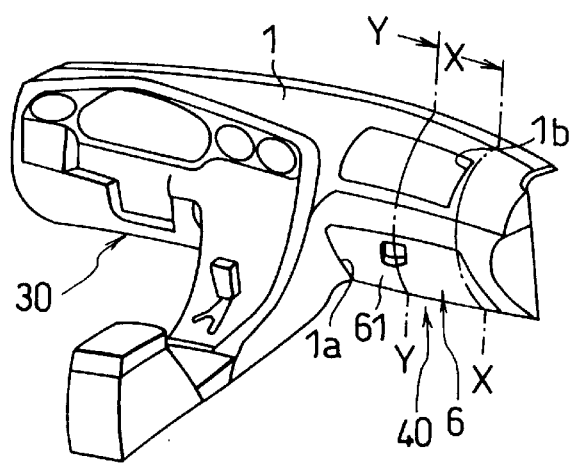
FIG. 2 is an external perspective view of an instrument panel for a vehicle.

Referring to FIG. 1, reference numeral denotes an instrument panel, in which a steering support beam 2 for supporting a steering column (not shown) is disposed in the widthwise direction of a vehicle. The steering support beam 2 is connected at both ends thereof with a left and right front pillar (not shown) through a bracket 2a, respectively. Further, the steering support beam 2 is connected on the driver side thereof with a pair of left and right knee guard brackets 3 and is connected on the passenger side thereof with a pair of left and right knee guard brackets 4.

These knee guard brackets 3, 4 have a U-shaped or C-shaped cross section and load inputting surfaces 3a, 4a, respectively, being connected by welding at the front end thereof with the steering support beam 2 so as to be located opposite to the knees of occupants seated on a driver's seat and a passenger's seat.

The left and right knee guard brackets 3, 3 on the driver side including the load inputting surfaces 3a, 3a are covered with the lower part of the instrument panel 1. In this case, the lower part of instrument panel 1 may be replaced with a knee pad member and the like, thus a knee guard 30 on the driver side being formed.

Figure 3A:
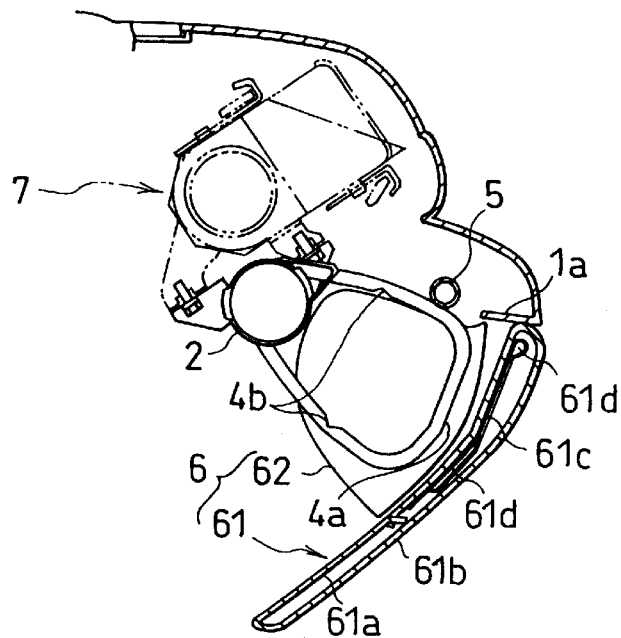
FIG. 3a is a cross-sectional view taken along line X—X of FIG. 2.
Figure 4:
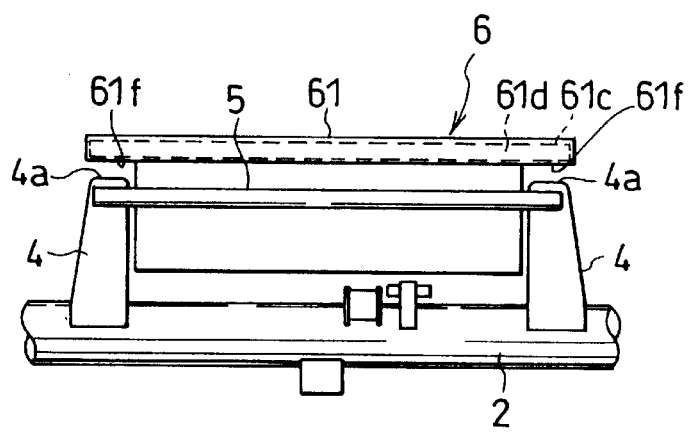
FIG. 4 is a plan view showing an arrangement of a knee guard bracket and a glove box.

The left and right knee guard brackets 4, 4 on the passenger side are disposed respectively along the left and right sides of a glove box which will be described hereinafter. As shown in FIG. 4, a closure member 61 of a glove box 6 has left and right flange sections 61f, 61f at left and right ends thereof and the left and right flange sections 61f, 61f are opposed adjacent to the left and right load inputting surfaces 4a, 4a, respectively. Further, a connecting member 5 fabricated of a pipe member connects the left and right knee guard brackets 4, 4 with each other. The connecting member 5 is disposed above the glove box 6 in a position not disturbing the closure and opening of the glove box 6. Further, as illustrated in FIG. 3a, there may be provided notches 4b, 4b on the knee guard brackets 4, 4 to help the buckling deformation of the knee guard brackets 4, 4. Thus, a knee guard 40 on the passenger side is constituted by the pair of the knee guard brackets 4, 4, the closure member 61 of the glove box 6 and the connecting member 5.

The glove box 6 includes the closure member 61 and a box member 62 and the left and right flange sections 61f, 61f are formed in a state of laterally overhanging from the box member 62. The glove box 6 is housed in a hollow provided under the instrument panel 1 on the passenger side and is hingedly connected to a pivot 63 so as to enable the closure and opening thereof.

Figure 3B:
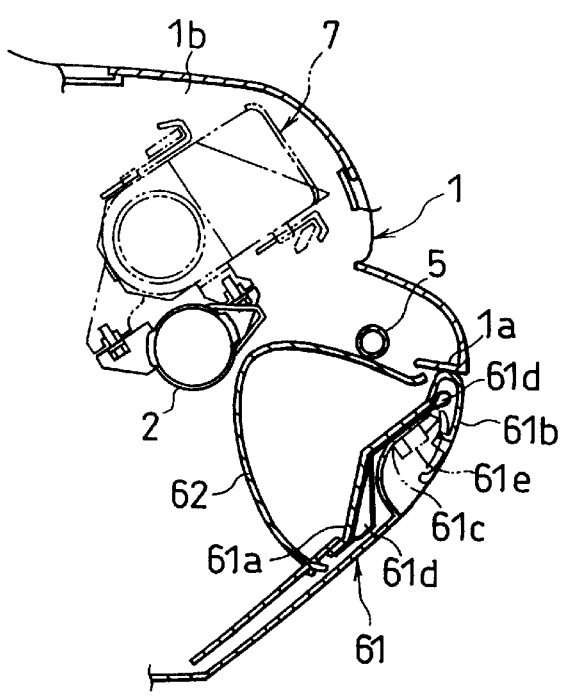
FIG. 3b is a cross-sectional view taken along line Y—Y of FIG. 2.

As shown in FIGS. 3a and 3b, the closure member 61 of the glove box 6 is constituted by an inner panel 61a and an outer panel 61b with a reinforcement 61c inside. The reinforcement has at least one closed cross section 61d extending laterally to the left and right flange sections 61f, 61f which are opposite adjacent to the load inputting surfaces 4a, 4a of the knee guard brackets 4, 4.

The load inputting surface 4a is corresponded to surfaces of the flange sections 61f and has a vertical length approximately equal to that of the reinforcement 61c.

Reference numeral 61e denotes a lock mechanism provided in the center of the closure member 61.

Further, there is provided an air bag system 7 in an opening 1b of the instrument panel 1 on the passenger side and it is mounted on the steering support beam 2 through a bracket. When an impact sensor (not shown) detects an impact, an air bag built in the air bag system 7 inflates and pushes to open a lid of the opening 1b. Since the operation of the air bag after deployment is well known, further detailed description is omitted.

When a head-on impact occurs, a vehicle driver abuts against the knee guard 30 on the driver seat at his or her knees and the knee guard brackets 3, 3 are subjected to the buckling deformation. During the deformation, the impact load is dispersively transmitted to the steering support beam and other vehicle body members to be absorbed therein. On the other hand, the head of the vehicle driver is held by the air bag coming on toward him or her.

Then, a passenger abuts against the closure member 61 of the glove box 6 at his or her knees and the left and right flange sections 61f, 61f contact the load inputting surfaces 4a, 4a of the knee guard brackets 4, 4. Thus, an impact load is inputted from the closure member 61 to the left and right knee guard brackets 4, 4. The knee guard brackets 4, 4 are subjected to the buckling deformation to absorb the impact load. On the other hand, the air bag system 7 is deployed and the coming on air bag holds the head of the passenger. At this moment, even in case where the knees of the passenger obliquely abut against the closure member 61 on an offset impact, since the closure member 61 is adequately reinforced by the reinforcement 61c and the closed cross section 61d, the closure member 61 conveys the impact load uniformly to the left and right load inputting surfaces 4a, 4a without having a large deformation. Thus, the impact load inputted to the closure member 61 is surely transmitted to the left and right knee guard brackets 4, 4. Further, since the left and right knee guard brackets 4, 4 are rigidly connected with each other by the connecting member 5, these brackets can be prevented from being deformed largely in the widthwise direction of the vehicle. Hence, while the knee guard brackets 4, 4 are subjected to the buckling deformation, the impact load is dispersively transmitted from the knee guard brackets 4, 4 to the steering support bean 2 and other body members. Further, since the load inputting surface 4a is formed into a configuration substantially agreeing with the front configuration of the flange section 61f, the impact load is uniformly transmitted to the knee guard bracket 4, 4. Further, when the impact load is not so large, the deformation of the closed cross section 61d absorbs the whole impact load without dispersion to other body members.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A knee guard structure for a vehicle having an instrument panel, and a steering support beam provided inside of said instrument panel, comprising:

left and right knee guard brackets secured to said steering support;

a glove box provided under said instrument panel, and including:

a closure member, a box member, and left and right flange sections formed on said closure member laterally overhanging from said box member, and disposed adjacent to said left and right knee guard brackets;

a reinforcement provided in said closure member; and a closed cross section provided on said reinforcement extending in the widthwise direction of said vehicle and covering said left and right flange sections, wherein said left and right knee guard brackets have a load inputting surface, respectively, and said load inputting surface is opposed adjacent to said left and right flange sections, and wherein said load inputting surface corresponded to surfaces of the flange sections said flange sections.

2. The knee guard structure according to claim 1, wherein said left and right knee guard brackets are formed into a loop-shape and both ends thereof are connected with said steering support beam.

3. The knee guard structure according to claim 1, further comprising a connecting member transversely connecting said left and right knee guard brackets, and disposed above said glove box in a position which enables the closure and opening of said glove box.

4. The knee guard structure according to claim 1, wherein a notch is provided on said left and right knee guard brackets.

5. The knee guard structure according to claim 1, wherein said load inputting surface is formed into a configuration agreeing with said flange sections and has a vertical length approximately equal to that of said reinforcement.

\* \* \* \* \*